3,033,903
OXIDATION OF AROMATIC HYDROCARBONS

William E. Loeb, Berkeley Heights, N.J., assignor to Union Carbide Corporation, a corporation of New York
No Drawing. Filed Aug. 7, 1958, Ser. No. 753,623
8 Claims. (Cl. 260—621)

This invention relates to a catalytic process for the oxidation of aromatic hydrocarbons. More specifically it relates to a process for oxidizing aromatic hydrocarbons in either the liquid or vapor phase with salts and oxides of trivalent titanium to form phenolic compounds.

At present the following three methods are preferably employed for making phenolic compounds. In the Raschig process benzene is first chlorinated at high pressures and temperatures and then the resulting chlorobenzene is hydrolyzed with concentrated sodium hydroxide. In order for this process to be economic the chlorine must be recovered. In the second process, benzene is first sulfonated with sulfuric acid and the benzene-sulfonic acid then hydrolyzed. Thirdly, in the cumene hydroperoxide process, benzene is first alkylated with propylene and the resultant cumene then autooxidized to give phenol and acetone. In order for this process to be economic the acetone must be utilized.

The production of phenolic compounds by direct oxidation of an aromatic compound has long been recognized as a desirable objective. A direct catalytic oxidation of aromatic hydrocarbons to give the corresponding phenols is an improvement in that only one reaction is necessary, and there are no by-products necessary to recover.

The prior art shows that processes do exist for the catalytic oxidation of aromatic hydrocarbons. However, these processes are not satisfactory since they suffer from one or more of the following defects: high temperatures, such as 325 to 800° C. are essential; the use of highly corrosive reagents such as hydrogen fluoride; the use of high pressures; and the use of various oxides of sulfur.

It has now been found that the oxides and salts of trivalent titanium when contacted with an aromatic hydrocarbon and oxygen will cause the formation of the corresponding phenolic compound.

The process of the present invention is applicable to the formation of hydroxyl containing compounds from any unsubstituted or substituted aromatic hydrocarbon. Illustrative of the aromatic compounds which can be used are: mononuclear aromatic compounds such as benzene; multinuclear aromatic hydrocarbons such as diphenyl, naphthalene and anthracene; alkyl, nitro, amine, ether, halogen, ketone, acid, and ester derivatives of aromatic hydrocarbons such as toluene, ortho-, meta-, and paraxylene, aniline, chlorobenzene, 1,2-dichlorobenzene, nitrobenzene, anisole, benzoic acid, acetophenone, 2-methyldiphenyl, ditolyl, 4-chlorodiphenyl, 3,3-dinitrodiphenyl, 2-aminodiphenyl, 2-methyl-naphthalene, 2-nitronaphthalene, 2-naphthoic acid, and the like.

The catalyst employed in the oxidation of the aromatic hydrocarbons to phenolic compounds is a salt or oxide of trivalent titanium. A few illustrative titanium compounds are: titanium trichloride, titanium sesquioxide, titanium (III) sulfate, titanium triacetate, titanium trioxalate, titanium triformate, and the like. The preferred catalyst is titanium trichloride. The quantity of the catalyst employed is not critical and can vary from about 0.1% to about 8% by weight based on the weight of the aromatic compound employed. A preferred concentration of the catalyst is from about 2% to about 5%.

The reaction can be conducted in either the liquid or vapor phase. The temperature of the reaction can vary from about 25° C. to about 800° C. and preferably from 25° C. to 100° C. Pressure can vary from about 1 to about 10 atmospheres and preferably from 1 atmosphere to autogenous pressures developed in the reaction.

A major advantage in the use of this process lies in the production of alpha naphthol. In the classic procedure wherein naphthalene is sulfonated and then fused with alkali a mixture of alpha and beta naphthol results in which beta naphthol is the primary product. By the instant process, however, alpha naphthol is the primary product.

Oxidation of the aromatic hydrocarbon can be effected with oxygen, air, oxygen-enriched air, ozone and the like. The amount of oxidizing gas required will vary with the extent of the reaction desired and the heat dissipating facilities which are provided in the reaction zone. The aromatic hydrocarbon may be dissolved in an aliphatic or cycloaliphatic inert organic solvent prior to the oxidation. Illustrative of such solvents are hexane, heptane, isooctane, cyclohexane, and the like. The phenols are recovered from the reacting mass by methods well known to those skilled in the art such as distillation or extraction.

In a preferred form of this invention titanium trichloride is suspended in the aromatic hydrocarbon, or a solution of the aromatic hydrocarbon in an inert aliphatic hydrocarbon and air is bubbled through the mixture. The mixture is preferably placed in a still and refluxed while the air is blown or bubbled through the mixture. After the reaction ceases, the phenol is recovered from the solvent as a metal salt by extraction with a base and the metal salt is then reconverted to the free phenol.

The following examples are illustrative of the invention.

Example 1.—Production of Cresol From Toluene

To 350 milliliters of toluene in a 500 milliliter round bottomed, 3-necked glass flask, equipped with a reflux condenser, mechanical stirrer, air inlet through a sparger extending below the surface of the liquid, an air exhaust tube attached to the reflux condenser, and a heating mantle, there was added 9.0 grams of finely divided crystalline titanium trichloride. The particle size of the titanium trichloride was about 100 to 300 microns. The mixture was heated to reflux and dry air was passed through the system at about one cubic foot per hour for five hours. During this period the color of the toluene-titanium trichloride suspension changed from a reddish purple to a dark brown. After refluxing for this period of time the mixture was added to 750 milliliters of water. The water layer was separated, and the toluene layer was washed three more times with 100 milliliter portions of water. The water washes plus the original water layer were combined and made strongly acidic with concentrated hydrochloric acid solution. The combined water washes were then extracted three times with 50 milliliter portions of ether. The combined ether extracts were then extracted with 5 percent aqueous sodium hydroxide solutions until the caustic wash was nearly colorless. The caustic wash was then acidified with concentrated hydrochloric acid solution, and a milky product separated. This product was separated by extraction with ether and the ether evaporated to give 0.140 gram of a phenolic product which was identified as para-cresol by infrared analysis.

Example 2.—Production of Phenol From Benzene

Ten grams of finely divided titanium trichloride was suspended in 400 milliliters of benzene in the apparatus described in Example 1. Dry air was passed through the suspension at about one cubic foot per hour for two hours while the suspension was refluxed. After recovery as described in Example 1, about 0.4 gram of phenol was isolated.

*Example 3.—Production of α-Naphthol From Naphthalene*

In the apparatus described in Example 1 there was placed 200 grams of naphthalene, 300 milliliters of isooctane and 10 grams of finely divided titanium trichloride. Dry air was then sparged through the mixture for three hours at the rate of about one cubic foot per hour while heating at the reflux temperature after which time the mixture was poured into 500 milliliters of water. Five hundred milliliters of ether were added, and the water layer then separated and extracted five times with 100 milliliter portions of ether. The combined organic layer and washes were then extracted with 5 percent sodium hydroxide solution, the combined caustic washes acidified, and finally extracted with ether as in Example 1. Evaporation of the ether after drying over Drierite gave 0.535 gram of a crystalline product which was identified as α-naphthol by infrared analysis.

What is claimed is:

1. A process for oxidizing aromatic hydrocarbon compounds having at least one unsubstituted position on the aromatic nucleus to the corresponding phenolic compound which comprises reacting the aromatic compound with oxygen at a temperature between 25° C. and 100° C. in the presence of a catalytic amount of a titanium compound selected from the group consisting of trivalent titanium salts and oxides.

2. The process for forming phenol from benzene which comprises reacting benzene with oxygen at a temperature between 25° C. and 100° C. in the presence of a catalytic amount of titanium trichloride.

3. The process for forming alpha-naphthol from naphthalene which comprises reacting naphthalene with oxygen at a temperature between 25° C. and 100° C. in the presence of a catalytic amount of titanium trichloride.

4. A process for oxidizing toluene to cresols which comprises reacting toluene with oxygen at a temperature between 25° C. and 100° C. in the presence of a catalytic amount of titanium trichloride.

5. A process for producing phenols which comprises forming a mixture of an aromatic hydrocarbon compound having at least one unsubstituted position on the aromatic nucleus and a catalytic amount of titanium trichloride, heating the mixture to a temperature of 25° C. to 100° C. and passing dry air through the heated mixture to oxidize the aromatic compound to a phenol.

6. The process of claim 5 wherein the aromatic compound is benzene.

7. The process of claim 5 wherein the aromatic compound is toluene.

8. The process of claim 5 wherein the aromatic compound is naphthalene.

References Cited in the file of this patent

UNITED STATES PATENTS 2,223,383    Moyer et al. _____ Dec. 3, 1940